United States Patent
Taylor et al.

(10) Patent No.: US 6,770,199 B1
(45) Date of Patent: Aug. 3, 2004

(54) METHOD OF EXTRACTING ENVIRONMENTAL CONTAMINANTS AND POLLUTANTS THROUGH BIOMASS HARVESTATION

(76) Inventors: Shawn R. Taylor, 9 Sherman Court, Halton Hills, Ontario (CA), L7G 1H1; Gintautas Antanas Kamaitis, 47 60th Street North, Wasaga Beach, Ontario (CA), L0L 2P0

( * ) Notice: Subject to any disclaimer, the term of this patent is extended or adjusted under 35 U.S.C. 154(b) by 16 days.

(21) Appl. No.: 10/345,221

(22) Filed: Jan. 16, 2003

(51) Int. Cl.[7] .............................. C05F 1/00; C02F 3/32; B09B 3/00
(52) U.S. Cl. ..................... 210/606; 210/612; 210/631; 210/632; 210/908; 210/912; 588/205; 588/231; 435/262.5; 435/267; 435/271; 435/272
(58) Field of Search ................................. 210/601, 602, 210/606, 631, 632, 908, 912; 435/262, 262.5, 267, 271, 272; 588/205, 231

(56) References Cited

U.S. PATENT DOCUMENTS

| | | | | |
|---|---|---|---|---|
| 1,922,484 A | * | 8/1933 | Omar et al. | 435/271 |
| 2,456,684 A | * | 12/1948 | Deatherage | 435/271 |
| 3,826,848 A | * | 7/1974 | Spinelli et al. | 426/7 |
| 4,405,649 A | * | 9/1983 | Jeffreys et al. | 426/59 |
| 4,656,137 A | * | 4/1987 | Balassa | 435/267 |
| 5,053,234 A | * | 10/1991 | Anderson et al. | 426/59 |
| 5,162,129 A | * | 11/1992 | Anderson et al. | 426/657 |
| 6,685,975 B2 | * | 2/2004 | Saxby et al. | 426/59 |
| 2002/0197707 A1 | * | 12/2002 | Falla et al. | 435/271 |
| 2003/0044952 A1 | * | 3/2003 | Nakajima et al. | 435/198 |

FOREIGN PATENT DOCUMENTS

WO        WO 97/24933        * 7/1997

* cited by examiner

*Primary Examiner*—Fred G. Prince
(74) *Attorney, Agent, or Firm*—Merek, Blackmon & Voorhees, LLC

(57) ABSTRACT

A method for extracting contaminants and pollutants from an ecosystem. The method includes extracting from the ecosystem a quantity of animal tissue and grinding or macerating the animal tissue to form a slurry-like mixture and adding the mixture to a digestion vessel. The pH of the ground animal tissue is reduced to a range of from approximately 3.5 to approximately 4.5 and the ground tissue is allowed to decompose through the action of digestive enzymes released from the visceral tissue of the animal tissue by the maceration step. The decomposed tissue is separated into a lipid portion, a proteinaceous portion and a bone fragment or hard tissue portion. At least a part of the lipid portion may then be extracted from the decomposed tissue for further processing or disposal of contaminants and pollutants contained therein.

21 Claims, 1 Drawing Sheet

METHOD OF EXTRACTING ENVIRONMENTAL CONTAMINANTS AND POLLUTANTS THROUGH BIOMASS HARVESTATION

FIELD OF THE INVENTION

This invention relates to a method of extracting environmental contaminants and pollutants through biomass harvestation, and in one particular aspect through the harvestation, and enzymatic digestion of animals and animal tissue into basic organic components.

BACKGROUND OF THE INVENTION

At an alarming rate a wide variety of persistent pollutants and contaminants are being introduced into our environment. Such pollutants are often the result of industrial processes, agricultural endeavours, or other aspects of human existence in an increasingly populated world. In other cases the sources of pollutants or contaminants may be natural as elements that are toxic to plant and/or animal life may sometimes naturally exist in native rock, soil and water. While the existence of pollutants and contaminants is of concern regardless of where they are found, persistent pollutants in bodies of water can be particularly detrimental to plants, animals and humans alike. Pollutants also tend to accumulate in bodies of water as toxic materials introduced into the atmosphere or soil often end up in bodies of water by way of precipitation, run-off, or through general ground water contamination.

Once a body of water becomes contaminated with a pollutant it often becomes difficult to purge that pollutant from the water system. Typically organic pollutants become concentrated in aquatic life and vegetation living within the water body. The concentration of pollutants tends to be higher in fish and animal life that exist higher up the food chain, to the extent that some aquatic life living in polluted bodies of water may themselves represent toxic materials within the definition of environmental protection and anti-pollution legislation. Higher life forms, and in particular predatory life forms, generally have the effect of extracting a portion of organic pollutants or contaminants from the environment through feeding on lower life forms that themselves have extracted pollutants from the water and/or underlying soil. However, once the higher life forms die and decompose the pollutants become reintroduced into the aquatic environment and begin to slowly make their way back up the food chain. A natural cycle is thus created that, if left on its own, has little chance of removing pollutants from the body of water. Most often the rate of the addition of pollutants far exceeds the ability of nature to purge them from a body of water, causing the water to slowly become more and more polluted.

Even where concerted efforts are made to reduce the amount of pollution added to a particular body of water or eco-system, such efforts have little impact or effect on reducing the contaminant load within the food chain of that ecosystem. Without a means to capture the contaminant materials and effectively eliminate them from the eco-system, the contaminants and pollutants will continue to cycle through the food chain and will continue to taint and affect organisms, including man. Currently, the recovery of biomass for contaminant capture is frustrated and inefficient due to the relatively large volume of water and other organic material that must be disposed of along with the contaminants. Disposing of biomass material is also wasteful from the perspective that valuable constituents and nutrients that may be contained within organisms are destroyed or disposed of along with the contaminants. Finally, and as indicated above, there are some situations where organisms from an eco-system are so severely contaminated that they themselves must be treated as a hazardous waste, which may prevent the depositing of such materials in landfills or may significantly increase the cost of their disposal and/or methods of destruction.

SUMMARY OF THE INVENTION

The invention therefore provides a method for selectively extracting pollutants or environmental contaminants from an ecosystem by means of biomass harvestation and subsequent processing. The method has as one of its underpinnings the realization that many pollutants and contaminants are persistent within an ecosystem due to the inability of living organisms to break them down. As a result, pollutants and contaminants often tend to accumulate and become concentrated within life forms that are higher up in the food chain such that the concentration of such materials in some cases can be several thousand times greater in high trophic-level predators than within the surrounding environment.

Accordingly, in one of its aspects the invention provides method for extracting contaminants and pollutants from an ecosystem, the method comprising the steps of (i) extracting from the ecosystem a quantity of animal tissue; (ii) grinding or macerating said animal tissue to form a slurry-like mixture and adding said mixture to a digestion vessel; (iii) reducing the pH of said ground animal tissue to a range of from approximately 3.5 to approximately 4.5 and allowing said ground tissue to decompose through the action of digestive enzymes released from the visceral tissue of said animal tissue by said maceration step; (iv) separating said decomposed tissue into a lipid portion, a proteinaceous portion and a bone fragment or hard tissue portion; and, (v) extracting at least a part of said lipid portion from said decomposed tissue for further processing or disposal of contaminants and pollutants contained therein.

In a further aspect the invention provides A method for concentrating and extracting environmental contaminants and pollutants from a body of water, the method comprising the steps of (i) extracting from the body of water a quantity of fish or other aquatic life forms; (ii) grinding or macerating said fish or aquatic life forms to form a slurry of ground tissue and adding said ground tissue to a digestion vessel; (iii) reducing the pH of said slurry of ground tissue to a range of approximately 3.5 to approximately 4.5 and allowing said slurry of ground tissue to decompose through the action of digestive enzymes released from visceral tissue of said fish or aquatic life forms by said maceration step; (iv) separating said decomposed tissue into a lipid portion, a proteinaceous portion and a bone fragment or hard tissue portion; and, (v) extracting at least a part of said lipid portion from said decomposed tissue for disposal or for further processing of contaminates and pollutants contained therein.

The invention further provides a method for concentrating and extracting environmental contaminants from an ecosystem, the method comprising the steps of (i) collecting and extracting from the ecosystem a quantity of animals or animal tissue; (ii) grinding or macerating said animals or animal tissue to form a slurry-like mixture of ground animal tissue and adding said ground tissue to a digestion vessel; (iii) adding to said slurry of ground animal tissue a carbohydrate and maintaining said ground tissue in said digestion vessel at a temperature of between approximately 8° C. and 35° C. to encourage fermentation, said fermentation causing a build up of acid such that as the pH of said ground animal tissue drops to below 4.5 said tissue decomposes through the action of digestive enzymes released from visceral tissue of said animals by said maceration step; (iv) separating said decomposed tissue into a lipid portion, a proteinaceous portion and a bone fragment or hard tissue portion; and, (v) extracting at least part of said lipid portion from said decomposed tissue for further processing or disposal of contaminants contained therein.

Further aspects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
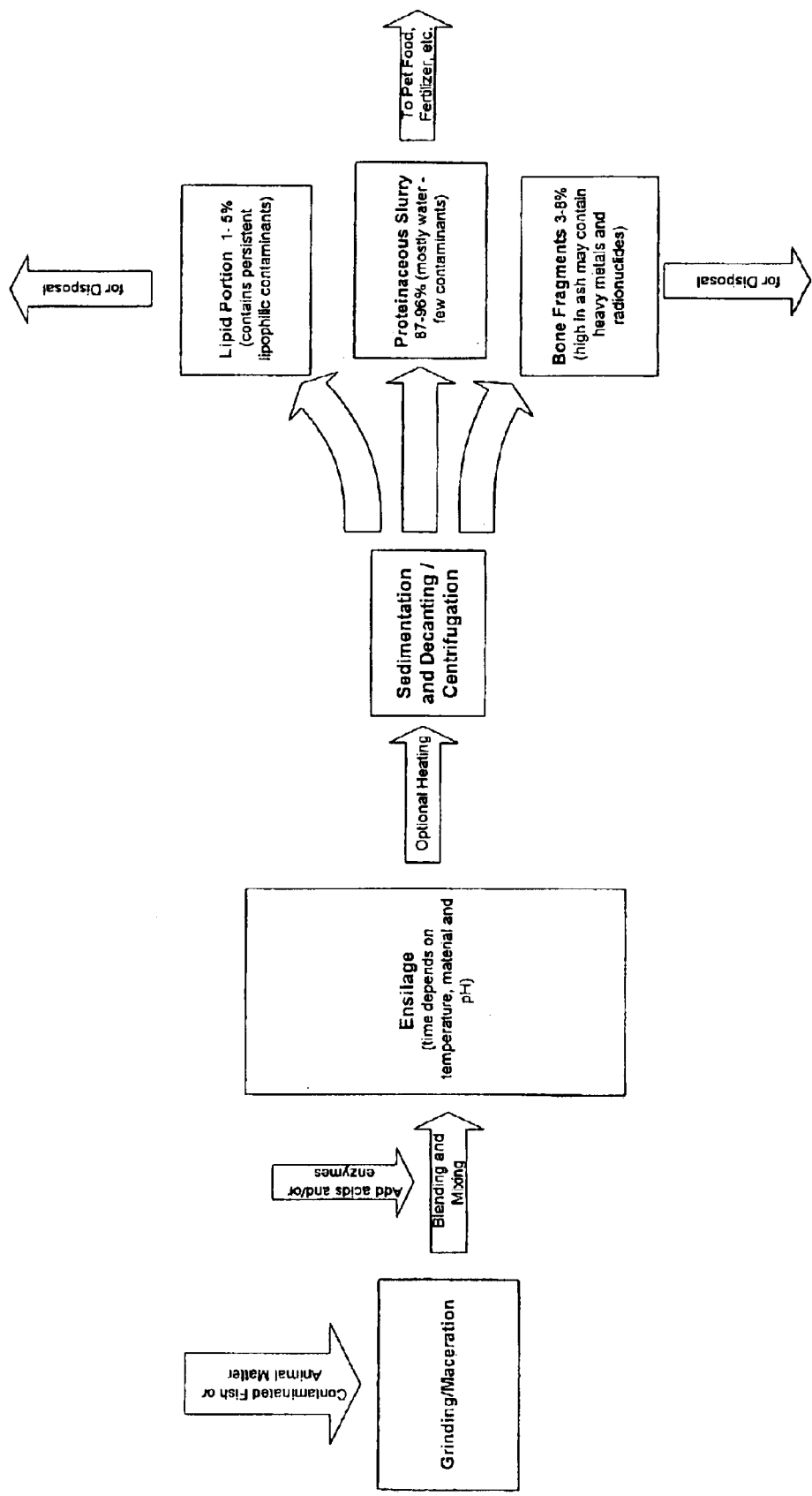
FIG. 1 is a flow chart showing the primary stages of the method according to one preferred embodiment of the current invention.

The present invention may be embodied in a number of different forms. However, the specification and drawings that follow describe and disclose only some of the specific forms of the invention and are not intended to limit the scope of the invention as defined in the claims that follow herein.

The inventive method described herein generally concerns a process which allows animals or other biomass having contaminants and other environmental pollutants built up within their tissues to be collected and harvested so that their tissues may be broken down into their fundamental chemical constituents, after which the contaminated components can be separated for appropriate disposal or destruction. The remaining, relatively contaminant-free, portions can then be utilized for a number of beneficial purposes, including the production of plant fertilizers and animal feed. The method provides a novel means for interrupting the constant cycling of contaminants and pollutants through an ecosystem and, with time, can have a measurable impact upon the contaminant load of sediment and organisms residing in an ecosystem.

It has been determined that many persistent environmental contaminants and pollutants tended to accumulate in certain types of animal tissue. Such pollutants include dioxin, mirex, heptachlor, endrin, chloradane, and DDT, many of which are exclusively lipid soluble and gravitate to fatty tissues when ingested by animals. Some forms of contaminants (for example, certain heavy metals) may also gravitate to hard tissues such as bone and cartilage. For the most part, persistent environmental contaminants and pollutants are not soluble in water and it is their insolubility which is the primary reason that they are retained and not excreted by a living organism following ingestion.

Keeping in mind the above, the method of the present invention is based on the realization that since many environmental contaminants and pollutants become entrained within the tissues of an organism when ingested, in many ecosystems living organism provide a source of concentrated levels of contaminants. This natural concentration of contaminants tends to increase with organisms that exist higher up on the food chain and, in the case of a polluted body of water, with bottom feeding organism or those that filter large volumes of water in search of food. Accordingly, the current method proposes extracting from an ecosystem a quantity of animal tissue or biomass and subjecting such material to a series of steps and processes as a means to further concentrate and isolate contaminants and pollutants so that they may then be more readily and efficiently separated and safely disposed of.

While it will be appreciated by those skilled in the art that a wide variety of different sources of biomass could be utilized, it is expected that a primary application of the method will be to assist in the extraction of contaminants and pollutants from a body of water. In such cases the biomass that is used will be that of fish, mollusks, and other aquatic species due to the tenancy of such species to contain relatively high levels of contaminants within their tissues. Fish and other aquatic organisms are also most often easily digested and typically have a relatively high fat content and a large portion of fresh visceral tissue, both of which are advantageous for the performance of the present invention. Fish and other aquatic life forms are also an attractive source material since they are often readily available and usually are easily harvested through a variety of means, including netting, electro-shock and other commonly used processes.

Once a quantity of animal tissue has been extracted from a body of water or an ecosystem, the tissue is ground or macerated to form a slurry-like mixture. The initial maceration can be accomplished through use of a wide range of equipment including choppers, chopper mixers, various forms of meat grinders, etc. Preferably the entire organism is macerated with all material mechanically broken down into a sufficiently small particle size (for example from approximately 1 mm to approximately 10 mm) such that the resulting slurry-like mixture will be a generally homogeneous mixture of ground tissue. The ground mixture will typically be placed within a digestion vessel for further processing.

In one preferred embodiment of the invention, the macerated tissue is subjected to a mixing stage where there is a complete mixing of all ground tissue. In some instances a secondary mixing, beyond that occurring naturally during the maceration step, will not be necessary. However, where different species of animals are utilized in a single process, or where large volumes of biomass are processed, it may be preferable to subject the macerated slurry to a mixing stage to ensure homogeneity and a complete distribution of all tissues. A homogeneous mixture of the ground biomass will ensure that the natural digestive enzymes present within the gut of the animal are released and distributed throughout the mixture. A homogeneous mixture will also help to prevent the development of pockets of spoilage, rancidity and putrification within the material, which can produce offensive ordours and limit the effectiveness of subsequent digestion processes that occur. Following the grinding or macerating of the animal tissue and any subsequent mixing stage that may be required, typically the pH of the ground animal tissue will be reduced to a range of from approximately 3.5 to approximately 4.5 through the addition of acid. A wide variety of different acids could be utilized for this purpose. In most instances it is expected that the acid will be chosen from the group including formic acid, sulphuric acid, hydrochloric acid, phosphoric acid, and nitric acid. A pH of from approximately 3.5 to 4.5 is generally optimal in order for the natural digestive enzymes from the gut of the animal to work and to permit decomposition and digestion of the ground tissue. In the absence of fresh or sufficient quantities of visceral material, commercial digestive enzymes or ensiling materials may be added to the mixture. In addition, even where there are sufficient naturally occurring enzymes present commercially available digestive or ensiling aids could also be added a means to speed up the digestive process. One example of a commercially available digestive enzyme that may be utilized in these regards is commonly sold under the trademark ENSILOX.

The efficiency of the digestive process, and the speed at which it proceeds, will be a function of the maintenance of a homogeneous blend of animal tissue and digestive enzymes, the temperature of the mixture, and its pH. When utilizing the present method on a relatively small scale the initial mixing of tissue and enzymes that occurs through maceration may be sufficient to remove any necessity for further mixing at a later point However, on larger scale operations regular mixing or agitation of the digesting material will generally help to enhance and accelerate the digestive process. In colder environments it may also be advantageous (or in some cases necessary) to add heat to the digesting mixture in order to maintain it within a desired temperature range. Ideally, for efficient digestion the temperature of the mixture should be maintained within a range of approximately 20° C. to approximately 30° C.

Depending on the volume of material being processed, it may also be desirable to monitor the pH of the mixture and to adjust the pH to keep it within a range of approximately 3.5 to approximately 4.5 in order to prevent spoilage or stalling of digestion. Generally the size and commercial restraints of the operation will dictate whether the pH is monitored periodically and adjusted manually, or whether a continuous monitoring system is implemented to add acid automatically as required to keep the pH of the mixture within the desired range.

In an alternate embodiment of the invention, the macerated material may initially be subjected to a fermentation stage. In this process a simple carbohydrate (which may be any readily available source of sugar or starch, such as ground and milled corn) is added to the macerated mixture to raise osmotic pressure and to thereby inhibit bacterial spoilage. The carbohydrate will also serve as a food source for lactic acid forming bacteria During fermentation, carbohydrates will be used up causing lactic acid levels to slowly increase and thereby decrease the pH of the material. Once the pH drops to approximately 4.5 or lower, the animal tissue will begin to be digested by the naturally occurring digestive enzymes from visceral material, in a manner that is similar to the acid induced digestion process described above. As in the case of the previously described embodiment, in the event that there are insufficient natural digestive enzymes present, commercially available digestive or ensiling aids may be added.

Typically, periodic monitoring of the digestion process will provide an indication as to the progress of the digestion and provide an indication of when digestion is substantially complete. Determining whether digestion is complete may be accomplished through a visual inspection of the material or through sampling and analyzing the digestive mixture. The cessation of bubbling and/or the stratification of the digestive material (with solids sinking to the bottom and lighter liquids floating to the top) provides a general visual indication that the digestive process is complete, or substantially complete. Alternatively, samples of the material can be taken and analyzed to determine the extent to which protein molecules have been broken down into their peptide chains. Once all or substantially all of the protein has been broken down, for present purposes digestion can be considered to be complete. Depending upon a wide number of factors (including temperature, degree of mixing, amount of digestive enzyme present, etc) the digestive process may take from a few days to several weeks.

Following digestion or decomposition of the animal tissue, the resulting material is separated into a lipid portion, a proteinaceous portion, and a bone fragment or hard tissue portion. Where mollusks or other shelled animals have been processed, the bone fragment portion will also include pieces of ground shells. The separation of the decomposed and digested tissue into these three primary components can be achieved through a variety of means, including simple decantation or gravitational separation, or through centrifugation. Digestion has the effect of breaking down the molecular structure of the cells of the tissue and releasing the contaminants and pollutants that were previously entrained within the tissue. Once released from the cell structure, most organic contaminants and pollutants will be contained within the lipid portion of the tissue, making it possible to extract those contaminants or pollutants through removing the lipid portion from the proteinaceous and bone fragment or hard tissue portions of the decomposed and digested material.

The volume of the lipid portion that contains the contaminants and pollutants will vary depending upon the nature of the animal tissue that is processed. However, in the processing of fish in most instances the lipid portion will represent from approximately 1% to 5% of the volume of the macerated material. That is, through utilization of the described method the majority of the contaminants and pollutants within the organism will be concentrated into a relatively small volume of material that can be readily separated from the remainder of the digested tissue. The lipid portion will also generally be free of a water component, thereby reducing its volume even further. The separated lipid portion, and the contaminants and pollutants that it contains, may then be processed to extract particular contaminants or may be otherwise disposed of. Since the lipid portion is easily combustible, the material is also suitable for high temperature incineration.

In the event that bone or other hard tissue is found to contain contaminants or pollutants (often heavy metals tend to accumulate in bone and other hard tissues), the bone fragment or hard tissue portion may be extracted separately and removed for further processing, disposal or destruction. Where the bone or hard tissue portion does not contain appreciable amounts of contaminants or pollutants it may be removed and utilized in the production of fertilizer or sent to landfill sites. Finally, in the majority of applications the proteinaceous portion of the digestive mixture will generally contain low levels of contaminants or pollutants, making it potentially useful in the production of animal feed or fertilizer.

It will thus be understood that the above described method presents a means to extract persistent environmental contaminants and pollutants from an ecosystem and the ability to effectively help break the never ending recycling of contaminants through the food chain. The method also presents a manner in which contaminants and pollutants may be isolated and concentrated prior to removal to permit the use of beneficial portions of the biomass that is harvested. The implementation of the described method provides a mechanism by which contaminants and pollutants may be concentrated in a relatively small volume of the total biomass that is collected, permitting an effective and efficient handling and destruction of the contaminants and pollutants.

In many instances the source of the biomass that is utilized could be invasive or exotic species within a particular ecosystem, providing yet a further environmental benefit through helping to reduce damage caused to ecosystems by non-native species. For example, in the Great Lakes area of Canada and the United States serious harm has been inflicted upon aquatic habitats and wetlands through the spread of Asian carp, gobies, zebra mussels, and other exotic species. Targeting such species as a source of animal tissue for the described method will thus have the benefit of both removing pollutants from the ecosystem and helping to reduce the detrimental impact of non-native species.

By running a comprehensive analysis on the contaminants and pollutants that are recovered, it may also be possible to "fingerprint" the contaminants and identify their source. Such "fingerprinting" may lead to more effective targeting for future clean-up efforts and may help to determine the responsibility for contaminant disposal efforts and costs.

Finally, it should also be appreciated that a wide variety of additional sources of animal tissue may be utilized under the claimed method. For example, remains from commercial fish processing plants and waste from slaughter houses and other meat processing industries may be used as a source of feedstock. Where the meat or flesh of an animal is within contaminant restriction limits for human consumption, toxins and pollutants may nevertheless have accumulated within internal organs. The waste from meat and fish processing plants therefore is often an ideal source of material from which contaminants and pollutants may be extracted under the above described process.

It is to be understood that what has been described are the preferred embodiments of the invention and that it may be possible to make variations to these embodiments while staying within the broad scope of the invention. Some of these variations have been discussed while others will be readily apparent to those skilled in the art.

We claim:

1. A method for extracting contaminants and pollutants from an ecosystem, the method comprising the steps of:
   (i) extracting from the ecosystem a quantity of animal tissue;
   (ii) grinding or macerating said animal tissue to form a slurry-like mixture and adding said mixture to a digestion vessel;
   (iii) reducing the pH of said ground animal tissue to a range of from approximately 3.5 to approximately 4.5 and allowing said ground tissue to decompose through the action of digestive enzymes released from the visceral tissue of said animal tissue by said maceration step;
   (iv) separating said decomposed tissue into a lipid portion, a proteinaceous portion and a bone fragment or hard tissue portion; and,
   (v) extracting at least a part of said lipid portion from said decomposed tissue for further processing or disposal of contaminants and pollutants contained therein.

2. The method as claimed in claim 1 including the further step of extracting at least a portion of said bone fragment or hard tissue portion from said decomposed animal tissue for disposal in a landfill site or for use in the production of fertilizer.

3. The method as claimed in claim 1 including incinerating said lipid portion extracted from said decomposed animal tissue to destroy contaminants and pollutants retained therein.

4. The method as claimed in claim 1 wherein at least a portion of said proteinaceous portion of said decomposed animal tissue is extracted and processed for use in animal feed or in the production of fertilizer.

5. The method as claimed in claim 1 wherein said step of separating said decomposed animal tissue into a lipid portion, a proteinaceous portion, and a bone fragment or hard tissue portion comprises subjecting said decomposed animal tissue to a centrifuge separation process.

6. The method as claimed in claim 1 wherein said step of separating said decomposed animal tissue into a lipid portion, a proteinaceous portion, and a bone fragment or hard tissue portion comprises subjecting said decomposed animal tissue to a decantation process.

7. The method as claimed in claim 1 including the step of monitoring the progress of said digestion processes through analyzing proteins within said decomposing ground animal tissue to determine the degree to which protein molecules have been broken down into their peptide chains.

8. The method as claimed in claim 1 wherein said ecosystem includes a body of water, said step of extracting a quantity of animal tissue from said ecosystem including the capture and removal of a quantity of fish or other aquatic animals from said body of water.

9. The method as claimed in claim 8 wherein said fish are extracted from said body of water by netting or through the use of electro-shock methods.

10. The method as claimed in claim 1 wherein one or more digestive enzymes are added to said ground animal tissue to enhance said digestion process.

11. The method as claimed in claim 1 including the further step of continuously mixing said ground animal tissue during said digestion processes.

12. The method as claimed in claim 1 including monitoring the pH of said ground tissue in said digestion vessel and maintaining said pH between approximately 3.5 and approximately 4.5 during digestion of said tissue.

13. A method for concentrating and extracting environmental contaminants and pollutants from a body of water, the method comprising the steps of:
   (i) extracting from the body of water a quantity of fish or other aquatic life forms;
   (ii) grinding or macerating said fish or aquatic life forms to form a slurry of ground tissue and adding said ground tissue to a digestion vessel;
   (iii) reducing the pH of said slurry of ground tissue to a range of approximately 3.5 to approximately 4.5 and allowing said slurry of ground tissue to decompose through the action of digestive enzymes released from visceral tissue of said fish or aquatic life forms by said maceration step;
   (iv) separating said decomposed tissue into a lipid portion, a proteinaceous portion and a bone fragment or hard tissue portion; and,
   (v) extracting at least a part of said lipid portion from said decomposed tissue for disposal or for further processing of contaminates and pollutants contained therein.

14. The method as claimed in claim 13 wherein said separation of said decomposed tissue into said lipid portion, said proteinaceous portion and said bone fragment or hard tissue portion is achieved through centrifugation or decantation.

15. The method as claimed in claim 13 including the further step of adding a digestive enzyme to said slurry of said ground tissue to assist in the decomposition and digestion of said tissue.

16. The method as claimed in claim 15 including monitoring the progress of said digestion process to determine when decomposition is substantially complete.

17. The method as claimed in claim 13 including monitoring the pH of said ground tissue in said digestion vessel and maintaining said pH between approximately 3.5 and approximately 4.5 during digestion of said tissue.

18. A method for concentrating and extracting environmental contaminants from an ecosystem, the method comprising the steps of:

(i) collecting and extracting from the ecosystem a quantity of animals or animal tissue;

(ii) grinding or macerating said animals or animal tissue to form a slurry-like mixture of ground animal tissue and adding said ground tissue to a digestion vessel;

(iii) adding to said slurry of ground animal tissue a carbohydrate and maintaining said ground tissue in said digestion vessel at a temperature of between approximately 25° C. and 35 C to encourage fermentation, said fermentation causing a build up of acid such that as the pH of said ground animal tissue drops to below 4.5 said tissue decomposes through the action of digestive enzymes released from visceral tissue of said animals by said maceration step;

(iv) separating said decomposed tissue into a lipid portion, a proteinaceous portion and a bone fragment or hard tissue portion; and, (v) extracting at least part of said lipid portion from said decomposed tissue for further processing or disposal of contaminants contained therein.

19. The method as claimed in claim 18 including the further step of continuously mixing said ground animal tissue during said digestion process.

20. The method as claimed in claim 19 wherein one or more digestive enzymes are added to said ground animal tissue to enhance said digestion process.

21. The method as claimed in claim 18 including monitoring the pH of said ground tissue in said digestion vessel, when said pH is determined to be below approximately 4.5, maintaining said pH at a range of between approximately 3.5 and approximately 4.5.

\* \* \* \* \*